United States Patent
Yasui et al.

(10) Patent No.: US 9,587,148 B2
(45) Date of Patent: *Mar. 7, 2017

(54) ADHESIVE COMPOSITION, ADHESIVE LAYER, POLARIZING FILM HAVING ADHESIVE AGENT LAYER, AND IMAGE FORMING DEVICE

(71) Applicant: NITTO DENKO CORPORATION, Ibaraki-shi, Osaka (JP)

(72) Inventors: Atsushi Yasui, Ibaraki (JP); Yuusuke Toyama, Ibaraki (JP); Tomoyuki Kimura, Ibaraki (JP); Masayuki Satake, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/360,552

(22) PCT Filed: Nov. 16, 2012

(86) PCT No.: PCT/JP2012/079818
§ 371 (c)(1),
(2) Date: May 23, 2014

(87) PCT Pub. No.: WO2013/077270
PCT Pub. Date: May 30, 2013

(65) Prior Publication Data
US 2014/0342151 A1    Nov. 20, 2014

(30) Foreign Application Priority Data
Nov. 24, 2011   (JP) .................. 2011-256442

(51) Int. Cl.
| C09J 133/08 | (2006.01) |
| C09J 11/06 | (2006.01) |
| C08K 5/54 | (2006.01) |
| C09J 11/08 | (2006.01) |
| G02B 1/04 | (2006.01) |
| G02B 5/30 | (2006.01) |
| C09J 133/06 | (2006.01) |
| C08K 5/541 | (2006.01) |
| C09J 7/02 | (2006.01) |
| C08K 5/43 | (2006.01) |
| C08K 5/42 | (2006.01) |
| C08K 5/5435 | (2006.01) |

(52) U.S. Cl.
CPC ............ *C09J 133/08* (2013.01); *C08K 5/541* (2013.01); *C09J 7/0246* (2013.01); *C09J 11/06* (2013.01); *C09J 11/08* (2013.01); *C09J 133/066* (2013.01); *G02B 1/04* (2013.01); *G02B 5/305* (2013.01); *C08K 5/42* (2013.01); *C08K 5/43* (2013.01); *C08K 5/54* (2013.01); *C08K 5/5435* (2013.01); *C08K 2201/017* (2013.01); *C09J 2203/318* (2013.01); *C09J 2205/102* (2013.01); *C09J 2433/00* (2013.01); *G02B 5/3033* (2013.01); *Y10T 428/2843* (2015.01); *Y10T 428/2891* (2015.01); *Y10T 428/31938* (2015.04)

(58) Field of Classification Search
CPC ... C09J 11/06; C09J 7/02; C09J 133/08; C09J 133/066; C09J 11/08; C09J 7/0246; G02B 5/30; G02B 1/04; G02B 1/045; C08K 5/541
USPC .......... 428/353, 355 AC, 522; 524/168, 165, 524/556
See application file for complete search history.

(56) References Cited

U.S. PATENT DOCUMENTS

2003/0032715 A1   2/2003  Sakaitani et al.
2006/0045990 A1   3/2006  Kim et al.
(Continued)

FOREIGN PATENT DOCUMENTS

CN   101368072 A   2/2009
CN   102076802 A   5/2011
(Continued)

OTHER PUBLICATIONS

Notification of Transmittal of Translation of the International Preliminary Report on Patentability (form PCT/IB/338) dated Jun. 5, 2014 of International Applcation No. PCT/JP2012/079818, with forms PCT/IB/373 and PCT/ISA/237 (6 pages).
(Continued)

*Primary Examiner* — Michael M Bernshteyn
(74) *Attorney, Agent, or Firm* — Westerman, Hattori, Daniels & Adrian, LLP

(57) ABSTRACT

A pressure-sensitive adhesive composition, comprising:
a (meth)acryl-based polymer (A); and
an ionic compound (B) comprising an anion component and a cation component, wherein
the (meth)acryl-based polymer (A) is a hydroxyl group-containing (meth)acryl-based polymer (A) containing a monomer unit derived from a hydroxyl group-containing monomer, and
the anion component has an organic group and three or more carbon atoms. The anion component is preferably at least one of anion components represented by the following formula (1):

$$(C_nF_{2n+1}SO_2)_2N^-  \quad (1)$$

wherein n is an integer of 3 to 10; the following formula (2):

$$CF_2(C_mF_{2m}SO_2)_2N^-  \quad (2)$$

wherein m is an integer of 2 to 10; and the following formula (3):

$$^-O_3S(CF_2)_lSO_3^-  \quad (3)$$

wherein l is an integer of 3 to 10.

15 Claims, No Drawings

(56) References Cited

U.S. PATENT DOCUMENTS

| | | | |
|---|---|---|---|
| 2006/0057368 | A1 | 3/2006 | Kobayashi et al. |
| 2006/0057371 | A1 | 3/2006 | Kobayashi et al. |
| 2006/0279923 | A1* | 12/2006 | Kim ................ C09J 133/06 361/679.01 |
| 2007/0191517 | A1 | 8/2007 | Chun et al. |
| 2009/0053519 | A1 | 2/2009 | Ogawa et al. |
| 2010/0017686 | A1 | 1/2010 | Luby et al. |
| 2010/0136265 | A1* | 6/2010 | Everaerts ........... C09J 133/066 428/1.31 |
| 2010/0188620 | A1 | 7/2010 | Kim et al. |
| 2010/0239859 | A1 | 9/2010 | Song et al. |
| 2011/0111140 | A1 | 5/2011 | Jang et al. |
| 2011/0123799 | A1 | 5/2011 | Yasui et al. |
| 2011/0230609 | A1 | 9/2011 | Oshita et al. |
| 2012/0121824 | A1 | 5/2012 | Toyama et al. |
| 2014/0308514 | A1 | 10/2014 | Yasui et al. |

FOREIGN PATENT DOCUMENTS

| | | |
|---|---|---|
| CN | 103917616 A | 7/2014 |
| JP | 2003013029 A | 1/2003 |
| JP | 2005-306937 A | 11/2005 |
| JP | 2006-111846 A | 4/2006 |
| JP | 2006-199873 A | 8/2006 |
| JP | 2007-321115 A | 12/2007 |
| JP | 2006-45475 A | 2/2008 |
| JP | 2008-517138 A | 5/2008 |
| JP | 2010-066755 A | 3/2010 |
| JP | 2010-106281 A | 5/2010 |
| JP | 2010-159346 A | 7/2010 |
| JP | 2010-523806 A | 7/2010 |
| JP | 2010159346 A * | 7/2010 |
| JP | 2010525098 A | 7/2010 |
| JP | 2010-229321 A | 10/2010 |
| JP | 2010-275524 A | 12/2010 |
| JP | 2011-16990 A | 1/2011 |
| JP | 2011-16999 A | 1/2011 |
| JP | 2011-17000 A | 1/2011 |
| JP | 2011-037927 A | 2/2011 |
| JP | 2011504537 A | 2/2011 |
| JP | 2011523806 A | 8/2011 |
| JP | 2011-526644 A | 10/2011 |
| JP | 2012-255120 A | 12/2012 |
| KR | 10-0694445 B1 | 3/2007 |
| KR | 10-0812507 B1 | 3/2008 |
| KR | 10-0980187 B1 | 9/2010 |
| TW | 201020306 A1 | 6/2010 |
| TW | 201107437 A1 | 3/2011 |
| TW | 201118142 A1 | 6/2011 |
| WO | 2010/064551 A1 | 6/2010 |
| WO | 2010/143643 A1 | 12/2010 |
| WO | WO 2010143643 A1 * | 12/2010 |

OTHER PUBLICATIONS

International Search Report dated Jul. 16, 2013, issued in Application No. PCT/JP2013/061092 (corresponding to U.S. Appl. No. 14/344,861).
Korean Notice of Allowance dated May 20, 2014, issued in Korean Patent Application No. 10-2014-7001056 (corresponding to U.S. Appl. No. 14/344,861)(2 pages).
Chinese Office Action dated Oct. 21, 2014, issued in Chinese Application No. 201380003781.3; w/English Translation, corresponding to U.S. Appl. No. 14/344,861 (4 pages).
U.S. Office Action dated Nov. 20, 2014, issued in U.S. Appl. No. 14/344,861 (29 pages).
U.S. Office Action dated Apr. 8, 2015, issued in U.S. Appl. No. 14/355,236 (30 pages).
Submission of Information dated Dec. 6, 2013 issued in application No. JP 2012-251239 (corresponding to U.S. Appl. No. 14/360,550)(9 pages).
Notification of Transmittal of Translation of the International Preliminary Report on Patentability (form PCT/IB/338) dated Oct. 30, 2014 of International Application No. PCT/JP2013/061092 with forms PCT/IB/373 and PCT/ISA/237 (6 pages) (corresponding to U.S. Appl. No. 14/344,861).
Notification of Transmittal of Translation of the International Preliminary Report on Patentability (form PCT/IB/338) dated May 22, 2014 of International Application No. PCT/JP2012/078506 with forms PCT/IB/373 and PCT/ISA/237 (6 pages) (corresponding to U.S. Appl. No. 14/355,236).
Notification of Transmittal of Translation of the International Preliminary Report on Patentability (form PCT/IB/338) dated Jun. 5, 2014 of International Application No. PCT/JP2012/079819 with forms PCT/IB/373 and PCT/ISA/237 (6 pages) (corresponding to U.S. Appl. No. 14/360,550).
International Search Report dated Dec. 11, 2012 issued in application No. PCT/JP2012/078506 (corresponding to U.S. Appl. No. 14/355,236).
International Search Report dated Dec. 11, 2012 issued in application No. PCT/JP2012/079819 (corresponding to U.S. Appl. No. 14/360,550).
International Search Report dated Dec. 11, 2012 issued in corresponding application No. PCT/JP2012/079818.
Office Action dated Sep. 11, 2015, issued in counterpart Japanese Application No. 2011-256442, with English Translation. (9 pages).
Office Action dated Jun. 3, 2015, issued in Chinese Application No. 201280054736.6 (counterpart to U.S. Appl. No. 14/360,552), with English translation (20 pages).
Office Action dated Jun. 3, 2015, issued in Chinese Application No. 201280054757.8 (counterpart to U.S. Appl. No. 14/355,236), with English translation (18 pages).
Office Action dated Jun. 12, 2015, issued in Chinese Application No. 201280054708.4 (counterpart to U.S. Appl. No. 14/360,550), with English translation (19 pages).
Office Action dated Jun. 19, 2015, issued in Japanese Application No. 2011-243549 (counterpart to U.S. Appl. No. 14/360,552), with English translation (12 pages).
Office Action dated Jun. 19, 2015, issued in Japanese Application No. 2011-256442 (counterpart to U.S. Appl. No. 14/355,236), with English translation (15 pages).
Notice of Allowance and Fee(s) Due dated May 1, 2015, issued in U.S. Appl. No. 14/344,861 (26 pages).
Office Action dated Jul. 1, 2016, issued in Japanese Patent Application No. 2012-251239, with English translation (12 pages), counterpart of U.S. Appl. No. 14/360,550.
Office Action dated Jan. 20, 2016, issued in counterpart Taiwanese Patent Application No. 101143664, with English translation (11 pages).
Office Action dated Jan. 20, 2016, issued in Taiwanese Patent Application No. 101141125, with English translation (11 pages) (Counterpart to U.S. Appl. No. 14/355,236).
Office Action dated Feb. 19, 2016, issued in Taiwanese Patent Application No. 101143665, with English translation (11 pages) (Counterpart to U.S. Appl. No. 14/360,550).
Office Action dated Feb. 5, 2016, issued in Chinese Patent Application No. 201280054708.4, with English translation (15 pages) (Counterpart to U.S. Appl. No. 14/360,550).
Office Action dated Feb. 22, 2016, issued in Japanese Patent Application No. 2012-251239, with English translation, counterpart to U.S. Appl. No. 14/360,550 (27 pages).
Office Action dated Mar. 10, 2016, issued in Japanese Patent Application No. 2012-251239, counterpart to U.S. Appl. No. 14/360,550, with English translation. (22 pages).
Office Action dated Nov. 24, 2016, issued in Japanese application No. 2012-251239 (counterparts to U.S. Appl. No. 14/360,555, with English translation (8 pages)).

* cited by examiner

ADHESIVE COMPOSITION, ADHESIVE LAYER, POLARIZING FILM HAVING ADHESIVE AGENT LAYER, AND IMAGE FORMING DEVICE

TECHNICAL FIELD

The present invention relates to a pressure-sensitive adhesive composition with a high antistatic function, a pressure-sensitive adhesive layer made from such a pressure-sensitive adhesive composition, and a pressure-sensitive adhesive layer-attached polarizing film including a polarizing film and such a pressure-sensitive adhesive layer. The present invention also relates to an image display device such as a liquid crystal display device, an organic electroluminescent (EL) display device, or a plasma display panel (PDP) produced with such a pressure-sensitive adhesive layer-attached polarizing film.

BACKGROUND ART

Liquid crystal display devices and other display devices have an image-forming mechanism including polarizing elements placed as essential components on both sides of a liquid crystal cell, in which polarizing films are usually attached as the polarizing elements. A pressure-sensitive adhesive is commonly used to bond such polarizing films to a liquid crystal cell. When such polarizing films are bonded to a liquid crystal cell, a pressure-sensitive adhesive is generally used to bond the materials together so that optical loss can be reduced. In such a case, the pressure-sensitive adhesive is provided in advance as a pressure-sensitive adhesive layer on one side of a polarizing film, and the resulting pressure-sensitive adhesive layer-attached polarizing film is generally used because it has some advantages such as no need for a drying process to fix the polarizing film. A release film is usually attached to the pressure-sensitive adhesive layer of the pressure-sensitive adhesive layer-attached polarizing film.

When a liquid crystal display device is manufactured, the pressure-sensitive adhesive layer-attached polarizing film is bonded to a liquid crystal cell. In this process, static electricity is generated when the release film is peeled off from the pressure-sensitive adhesive layer of the pressure-sensitive adhesive layer-attached polarizing film. The static electricity generated in this manner may affect the orientation of the liquid crystal in the liquid crystal display device to cause a failure. The static electricity may also cause display unevenness when the liquid crystal display device operates. For example, the static generation can be suppressed when an antistatic layer is formed on the outer surface of the polarizing film. In this case, however, the effect is not high, and there is still a problem in that static generation cannot be fundamentally prevented. To suppress static generation in a fundamental position, therefore, the pressure-sensitive adhesive layer is required to have an antistatic function. Concerning means for providing an antistatic function to a pressure-sensitive adhesive layer, for example, it is proposed that an ionic compound should be added to a pressure-sensitive adhesive used to form a pressure-sensitive adhesive layer (Patent Documents 1 to 6).

PRIOR ART DOCUMENTS

Patent Documents

Patent Document 1: JP-A-2005-306937
Patent Document 2: JP-W-2006-111846
Patent Document 3: JP-A-2008-517138
Patent Document 4: JP-W-2010-523806
Patent Document 5: JP-A-2011-016990
Patent Document 6: JP-A-2011-017000

SUMMARY OF THE INVENTION

Problems to be Solved by the Invention

Patent Documents 1 and 2 disclose that a pressure-sensitive adhesive layer with an antistatic function can be made from a pressure-sensitive adhesive composition containing an ionic compound having a bis(pentafluoroethanesulfonyl)imide anion component. Patent Documents 3 and 4 disclose that a pressure-sensitive adhesive layer with an antistatic function can be made from a pressure-sensitive adhesive composition containing an ionic compound having a bistrifluoromethanesulfonimide or bistrifluoroethanesulfonimide anion component. However, the pressure-sensitive adhesive layers made from these pressure-sensitive adhesive compositions containing an ionic compound can increase in surface resistance and degrade in antistatic function when exposed to conditions exceeding normal temperature and normal humidity, such as hot and humid conditions at 60° C. and 90% RH or at 60° C. and 95% RH.

Patent Documents 5 and 6 disclose that a pressure-sensitive adhesive composition containing an ionic compound having an imide anion with a carbon atom-containing perfluoroalkyl group cannot form a pressure-sensitive adhesive layer with a sufficiently improved antistatic function, whereas a pressure-sensitive adhesive composition containing an ionic compound having a bis(fluorosulfonyl)imide anion can form a pressure-sensitive adhesive layer with an improved antistatic function. Unfortunately, the disclosures in these patent documents do not aim to suppress an increase in surface resistance after a humidity test. These patent documents do not specifically disclose or suggest any surface resistance after exposure to hot and humid conditions.

It is an object of the present invention to provide a pressure-sensitive adhesive composition whose durability and other main properties are high and which can form a pressure-sensitive adhesive layer having particularly high moisture resistance of antistatic function, and to provide such a pressure-sensitive adhesive layer and a polarizing film provided with such a pressure-sensitive adhesive layer.

It is another object of the present invention to provide an image display device including such a pressure-sensitive adhesive layer-attached polarizing film.

Means for Solving the Problems

As a result of earnest study to solve the problems, the present inventors have found the pressure-sensitive adhesive composition described below, resulting in the completion of the present invention.

Specifically, the present invention is directed to a pressure-sensitive adhesive composition, comprising:
a (meth)acryl-based polymer (A); and
an ionic compound (B) comprising an anion component and a cation component, wherein
the (meth)acryl-based polymer (A) is a hydroxyl group-containing (meth)acryl-based polymer (A) containing a monomer unit derived from a hydroxyl group-containing monomer, and
the anion component has an organic group and three or more carbon atoms.

In the pressure-sensitive adhesive composition, it is preferred that the anion component is at least one of anion components represented by the following formula (1):

$$(C_nF_{2n+1}SO_2)_2N^-  \quad (1)$$

wherein n is an integer of 3 to 10; the following formula (2):

$$CF_2(C_mF_{2m}SO_2)_2N^-  \quad (2)$$

wherein m is an integer of 2 to 10; and the following formula (3):

$$^-O_3S(CF_2)_lSO_3^-  \quad (3)$$

wherein l is an integer of 3 to 10.

In the pressure-sensitive adhesive composition, it is preferred that the cation component of the ionic compound (B) is at least one of an alkali metal cation and an organic cation.

In the pressure-sensitive adhesive composition, it is preferred that the cation component of the ionic compound (B) is a lithium cation.

In the pressure-sensitive adhesive composition, it is preferred that the anion component of the ionic compound (B) is at least one of a bis(heptafluoropropanesulfonyl)imide anion, a bis(nonafluorobutanesulfonyl)imide anion, a cyclohexafluoropropane-1,3-bis(sulfonyl)imide anion, and a hexafluoropropane-1,3-disulfonate anion.

In the pressure-sensitive adhesive composition, it is preferred that the pressure-sensitive adhesive composition comprises 0.001 to 10 parts by weight of the ionic compound (B) based on 100 parts by weight of the hydroxyl group-containing (meth)acryl-based polymer (A).

In the pressure-sensitive adhesive composition, it is preferred that the hydroxyl group-containing (meth)acryl-based polymer (A) contains a monomer unit derived from a carboxyl group-containing monomer.

In the pressure-sensitive adhesive composition, it is preferred that the pressure-sensitive adhesive composition further comprises a crosslinking agent (C), more preferred that the pressure-sensitive adhesive composition comprises 0.01 to 20 parts by weight of the crosslinking agent (C) based on 100 parts by weight of the hydroxyl group-containing (meth)acryl-based polymer (A), still more preferred that the crosslinking agent (C) is at least one of an isocyanate compound and a peroxide.

In the pressure-sensitive adhesive composition, it is preferred that the pressure-sensitive adhesive composition comprises 0.001 to 5 parts by weight of a silane coupling agent (D) based on 100 parts by weight of the hydroxyl group-containing (meth)acryl-based polymer (A), or that the pressure-sensitive adhesive composition comprises 0.001 to 10 parts by weight of a polyether-modified silicone (E) based on 100 parts by weight of the hydroxyl group-containing (meth)acryl-based polymer (A).

In the pressure-sensitive adhesive composition, it is preferred that the hydroxyl group-containing (meth)acryl-based polymer (A) has a weight average molecular weight of 500,000 to 3,000,000.

The present invention is also directed to a pressure-sensitive adhesive layer comprising a product made from the pressure-sensitive adhesive composition recited above.

The present invention is also directed to a pressure-sensitive adhesive layer-attached polarizing film comprising at least a polarizing film and the pressure-sensitive adhesive layer recited above. In the pressure-sensitive adhesive layer-attached polarizing film, it is preferred that the pressure-sensitive adhesive layer-attached polarizing film further comprises an adhesion-facilitating layer between the polarizing film and the pressure-sensitive adhesive layer.

The present invention is also directed to an image display device comprising at least one piece of the pressure-sensitive adhesive layer-attached polarizing film recited above.

Effect of the Invention

If an ionic compound is added to a pressure-sensitive adhesive composition containing an acryl-based polymer as a base polymer, an antistatic function can be imparted to the pressure-sensitive adhesive composition. On the other hand, if an ionic compound exists on the surface of a pressure-sensitive adhesive layer, the adhering strength between the pressure-sensitive adhesive layer and the adherend may decrease, and after a test of exposure to hot and humid conditions, the surface resistance of the pressure-sensitive adhesive layer may increase so that the antistatic function may be lost.

The pressure-sensitive adhesive composition according to the present invention contains the ionic compound (B) capable of imparting an antistatic function in addition to the hydroxyl group-containing (meth)acryl-based polymer (A) as a base polymer, and the pressure-sensitive adhesive layer made from the pressure-sensitive adhesive composition has a good antistatic function. In particular, the pressure-sensitive adhesive composition according to the present invention, which contains the ionic compound (B) having an anion component with a relatively large molecular weight or an anion component with a cyclic structure, can form a pressure-sensitive adhesive layer whose surface resistance is kept low even after a humidity test. Therefore, the pressure-sensitive adhesive layer made from the pressure-sensitive adhesive composition according to the present invention and the pressure-sensitive adhesive layer-attached polarizing film having the pressure-sensitive adhesive layer have high levels of durability and other main properties and also have particularly high moisture resistance of antistatic function.

Pressure-sensitive adhesive layers made from some pressure-sensitive adhesive compositions containing an ionic compound can be peeled off after humidification, although this is slight, or can be more likely to foam after overheating. According to the present invention, however, the use of the specified ionic compound (B) and the hydroxyl group-containing (meth)acryl-based polymer (A) makes it possible to provide high moisture resistance of antistatic function and a particularly high level of anti-foaming properties and resistance to moisture-induced peeling.

MODE FOR CARRYING OUT THE INVENTION

The pressure-sensitive adhesive composition according to the present invention contains a hydroxyl group-containing (meth)acryl-based polymer (A) as a base polymer. The hydroxyl group-containing (meth)acryl-based polymer (A) generally contains, as a main component, a monomer unit derived from an alkyl(meth)acrylate. As used herein, the term "(meth)acrylate" refers to acrylate and/or methacrylate, and "(meth)" is used in the same meaning in the description.

Examples of the alkyl(meth)acrylate forming the main skeleton of the hydroxyl group-containing (meth)acryl-based polymer (A) include alkyl(meth)acrylates having a linear or branched alkyl group of 1 to 18 carbon atoms. Examples of such an alkyl group may include a methyl group, an ethyl group, a propyl group, an isopropyl group, a butyl group, an isobutyl group, an amyl group, a hexyl group, a cyclohexyl group, a heptyl group, a 2-ethylhexyl group, an isooctyl group, a nonyl group, a decyl group, an isodecyl group, a dodecyl group, an isomyristyl group, a lauryl group, a tridecyl group, a pentadecyl group, a hexadecyl group, a heptadecyl group, an octadecyl group, and the like. These groups may be used singly or in any combination. Such alkyl groups preferably have an average number of carbon atoms of 3 to 9.

The hydroxyl group-containing (meth)acryl-based polymer (A) contains a monomer unit derived from a hydroxyl group-containing monomer. Specific examples of such a hydroxyl group-containing monomer include 2-hydroxyethyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and (4-hydroxymethylcyclohexyl)methyl acrylate. The hydroxyl group-containing monomer preferably makes up 1 to 10% by weight, more preferably 3 to 7% by weight of all the monomers (100% by weight) used to form the hydroxyl group-containing (meth)acryl-based polymer (A).

An aromatic ring-containing alkyl(meth)acrylate such as phenoxyethyl(meth)acrylate or benzyl(meth)acrylate may also be used for pressure-sensitive adhesive properties, durability, control of retardation, control of refractive index, or other purposes. The aromatic ring-containing alkyl(meth)acrylate may be used to produce a polymer for use in mixing with the (meth)acryl-based polymer mentioned above. In view of transparency, however, the aromatic ring-containing alkyl(meth)acrylate is preferably used together with the alkyl(meth)acrylate to form a copolymer.

The aromatic ring-containing alkyl(meth)acrylate may make up 50% by weight or less of all the monomers (100° by weight) used to form the hydroxyl group-containing (meth)acryl-based polymer (A). The aromatic ring-containing alkyl(meth)acrylate preferably makes up 1 to 35% by weight, more preferably 5 to 30% by weight, even more preferably 10 to 25% by weight of all the monomers.

To improve tackiness or heat resistance, one or more copolymerizable monomers having an unsaturated double bond-containing polymerizable functional group such as a (meth)acryloyl group or a vinyl group may be introduced into the hydroxyl group-containing (meth)acryl-based polymer (A) by copolymerization. Examples of such copolymerizable monomers include carboxyl group-containing monomers such as (meth)acrylic acid, carboxyethyl(meth)acrylate, carboxypentyl(meth)acrylate, itaconic acid, maleic acid, fumaric acid, and crotonic acid; acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; and phosphate group-containing monomers such as 2-hydroxyethylacryloyl phosphate.

Examples of such monomers for modification also include (N-substituted) amide monomers such as (meth)acrylamide, N,N-dimethyl(meth)acrylamide, N-butyl(meth)acrylamide, N-methylol(meth)acrylamide, and N-methylolpropane (meth)acrylamide; alkylaminoalkyl(meth)acrylate monomers such as aminoethyl(meth)acrylate, N,N-dimethylaminoethyl(meth)acrylate, and tert-butylaminoethyl(meth) acrylate; alkoxyalkyl(meth)acrylate monomers such as methoxyethyl(meth)acrylate and ethoxyethyl(meth)acrylate; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine; maleimide monomers such as N-cyclohexylmaleimide, N-isopropylmaleimide, N-laurylmaleimide, and N-phenylmaleimide; and itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide.

Examples of modifying monomers that may also be used include vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl(meth)acrylate; glycol acrylate monomers such as polyethylene glycol(meth)acrylate, polypropylene glycol (meth)acrylate, methoxyethylene glycol(meth)acrylate, and methoxypolypropylene glycol(meth)acrylate; and acrylic ester monomers such as tetrahydrofurfuryl(meth)acrylate, fluoro(meth)acrylate, silicone(meth)acrylate, and 2-methoxyethyl acrylate. Examples also include isoprene, butadiene, isobutylene, vinyl ether, etc.

Copolymerizable monomers other than the above include silane monomers containing a silicon atom. Examples of such silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

Examples of copolymerizable monomers that may also be used include polyfunctional monomers having two or more unsaturated double bonds such as those in (meth)acryloyl groups or vinyl groups, which include (meth)acrylic esters of polyhydric alcohols, such as tripropylene glycol di(meth) acrylate, tetraethylene glycol di(meth)acrylate, 1,6-hexanediol di(meth)acrylate, bisphenol A diglycidyl ether di(meth) acrylate, neopentyl glycol di(meth)acrylate, trimethylolpropane tri(meth)acrylate, pentaerythritol tri (meth)acrylate, pentaerythritol tetra(meth)acrylate, dipentaerythritol penta(meth)acrylate, dipentaerythritol hexa(meth)acrylate, and caprolactone-modified dipentaerythritol hexa(meth)acrylate; and polyester (meth)acrylates, epoxy (meth)acrylates, urethane(meth)acrylates, or other compounds having a polyester, epoxy, or urethane skeleton, to which two or more unsaturated double bonds are added in the form of functional groups such as (meth)acryloyl groups or vinyl groups in the same manner as the constituent monomers.

Concerning the weight contents of all the monomers used to form the hydroxyl group-containing (meth)acryl-based polymer (A), the alkyl(meth)acrylate should be a main component, and the content of the copolymerizable monomer is preferably, but not limited to, 0 to about 20%, more preferably about 0.1 to about 15%, even more preferably about 0.1 to about 10%, based on the total weight of all the monomers used to form the hydroxyl group-containing (meth)acryl-based polymer (A).

Among these copolymerizable monomers, carboxyl group-containing monomers are preferably used in view of tackiness or durability. When the pressure-sensitive adhesive composition contains a crosslinking agent, carboxyl group-containing monomers can serve as reactive sites to the crosslinking agent. Such carboxyl group-containing monomers are highly reactive with intermolecular crosslinking agents and therefore are preferably used to improve the cohesiveness or heat resistance of the resulting pressure-sensitive adhesive layer. Carboxyl group-containing monomers are advantageous in providing both durability and reworkability.

When a carboxyl group-containing monomer is added as a copolymerizable monomer, the content thereof is preferably from 0.05 to 10% by weight, more preferably from 0.1 to 8% by weight, even more preferably from 0.2 to 6% by weight.

In the present invention, the hydroxyl group-containing (meth)acryl-based polymer (A) used preferably has a weight average molecular weight in the range of 500,000 to 3,000,000. In view of durability, particularly, heat resistance, the (meth)acryl-based polymer (A) used preferably has a weight average molecular weight of 700,000 to 2,700,000. It more preferably has a weight average molecular weight of 800,000 to 2,500,000. A weight average molecular weight of less than 500,000 is not preferred in view of heat resistance. If the weight average molecular weight is more than 3,000,000, a large amount of a diluent solvent can be necessary for adjusting the viscosity to be suitable for coating, which may increase cost and is not preferred. The weight average molecular weight refers to a polystyrene-equivalent molecular weight as measured and calculated using gel permeation chromatography (GPC).

The hydroxyl group-containing (meth)acryl-based polymer (A) described above can be produced by a method appropriately selected from known methods such as solution polymerization, bulk polymerization, emulsion polymerization, and various types of radial polymerization. The resulting hydroxyl group-containing (meth)acryl-based polymer (A) may be a random copolymer, a block copolymer, a graft copolymer, or any other form.

In solution polymerization, for example, ethyl acetate, toluene, or the like may be used as a polymerization solvent. An example of solution polymerization includes performing the reaction under a stream of inert gas such as nitrogen in the presence of a polymerization initiator typically under the reaction conditions of a temperature of about 50 to about 70° C. and a time period of about 5 to about 30 hours.

Any appropriately selected polymerization initiator, chain transfer agent, emulsifier, or other agents may be used for radical polymerization. The weight average molecular weight of the hydroxyl group-containing (meth)acryl-based polymer (A) can be adjusted by controlling the amount of the polymerization initiator or the chain transfer agent or by controlling the reaction conditions. The amount of these agents may be adjusted as appropriate depending on the type of these agents.

Examples of the polymerization initiator include, but are not limited to, azo initiators such as 2,2'-azobisisobutyronitrile, 2,2'-azobis(2-amidinopropane)dihydrochloride, 2,2'-azobis[2-(5-methyl-2-imidazolin-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrato (VA-057 manufactured by Wako Pure Chemical Industries, Ltd.); persulfates such as potassium persulfate and ammonium persulfate; peroxide initiators such as di(2-ethylhexyl) peroxydicarbonate, di(4-tert-butylcyclohexyl) peroxydicarbonate, di-sec-butyl peroxydicarbonate, tert-butyl peroxyneodecanoate, tert-hexyl peroxypivalate, tert-butyl peroxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butyl peroxyisobutyrate, 1,1-di(tert-hexylperoxy)cyclohexane, tert-butyl hydroperoxide, and hydrogen peroxide; and a redox system initiator including a combination of a peroxide and a reducing agent, such as a combination of a persulfate and sodium hydrogen sulfite or a combination of a peroxide and sodium ascorbate.

The polymerization initiators may be used singly or in combination of two or more. The total content of the polymerization initiator(s) is preferably from about 0.005 to about 1 part by weight, more preferably from about 0.02 to about 0.5 parts by weight, based on 100 parts by weight of the monomers.

For example, when the hydroxyl group-containing (meth)acryl-based polymer (A) with a weight average molecular weight as shown above is produced using 2,2'-azobisisobutyronitrile as a polymerization initiator, the amount of the polymerization initiator is preferably from about 0.06 to about 0.2 parts by weight, more preferably from about 0.08 to about 0.175 parts by weight, based on 100 parts by weight of all the monomers.

Examples of the chain transfer agent include lauryl mercaptan, glycidyl mercaptan, mercaptoacetic acid, 2-mercaptoethanol, thioglycolic acid, 2-ethylhexyl thioglucolate, and 2,3-dimercapto-1-propanol. The chain transfer agents may be used singly or in combination of two or more. The total content of the chain transfer agent(s) should be about 0.1 parts by weight or less based on 100 parts by weight of all the monomers.

Examples of the emulsifier for use in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used singly or in combination of two or more.

The emulsifier may be a reactive emulsifier. Examples of such an emulsifier having an introduced radically-polymerizable functional group, such as a propenyl group or an allyl ether group, include AQUALON HS-10, HS-20, KH-10, BC-05, BC-10, and BC-20 (all manufactured by Daiichi Kogyo Seiyaku Co., Ltd.) and ADEKA REASOAP SE10N (manufactured by ADEKA CORPORATION). The reactive emulsifier is preferred because after polymerization, it can improve water resistance by being incorporated in the polymer chain. Based on 100 parts by weight of all the monomers, the emulsifier is preferably used in an amount of 0.3 to 5 parts by weight, more preferably 0.5 to 1 part by weight, in view of polymerization stability or mechanical stability.

In addition to the hydroxyl group-containing (meth)acryl-based polymer (A), the pressure-sensitive adhesive composition according to the present invention contains (B) an ionic compound. The ionic compound (B) has an anion component and a cation component.

(Anion Component of Ionic Compound (B))

In the present invention, when the anion component of ionic compound (B) has an organic group and three or more carbon atoms, high moisture resistance of antistatic function and a particularly high level of anti-foaming properties and resistance to moisture-induced peeling can be achieved with using the hydroxyl group-containing (meth)acryl-based polymer (A). Particularly the anion component of ionic compound (B) is at least one of anion components represented by the following formula (1):

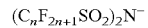  (1)

wherein n is an integer of 3 to 10; the following formula (2):

$$CF_2(C_mF_{2m}SO_2)_2N^- \qquad (2)$$

wherein m is an integer of 2 to 10; and the following formula (3):

$$^-O_3S(CF_2)_lSO_3^- \qquad (3)$$

wherein l is an integer of 3 to 10, the effect of high moisture resistance of antistatic function, anti-foaming properties and resistance to moisture-induced peeling can be enhanced remarkably.

For example, the anion component represented by the general formula (1) may be a bis(heptafluoropropanesulfonyl)imide anion, a bis(nonafluorobutanesulfonyl)imide anion, a bis(undecafluoropentanesulfonyl)imide anion, a bis(tridecafluorohexanesulfonyl)imide anion, or a bis(pentadecafluoroheptanesulfonyl)imide anion. Among them, a bis(heptafluoropropanesulfonyl)imide anion or a bis(nonafluorobutanesulfonyl)imide anion is particularly preferred.

For example, the anion component represented by the general formula (2) may be a cyclo-hexafluoropropane-1,3-bis(sulfonyl)imide anion, which can be advantageously used.

Specific examples of the anion component represented by the above formula (3) include a hexafluoropropane-1,3-disulfonate anion, which can be advantageously used.
(Cation Component of the Ionic Compound (B))

The cation component of the ionic compound (B) may be an alkali metal ion such as a lithium, sodium, or potassium ion, which forms an alkali metal salt as the ionic compound (B) with the anion component shown above. When the ionic compound (B) in the pressure-sensitive adhesive composition contains a potassium ion, among alkali metal ions, the pressure-sensitive adhesive layer made from the pressure-sensitive adhesive composition tends to have a higher initial surface resistance. On the other hand, when the ionic compound (B) in the composition contains a lithium ion, the initial surface resistance of the pressure-sensitive adhesive layer can be reduced, and an increase in the surface resistance after humidification can be suppressed.

Generally, as the content of the ionic compound (B) in the pressure-sensitive adhesive composition increases, the antistatic performance of the composition increases, but the durability of the composition tends to be insufficient. Generally, there tends to be a trade-off between the antistatic function and the durability. However, when the ionic compound (B) used contains a lithium ion, the antistatic function, and particularly the moisture durability of the antistatic function can be improved even at a lower content of the ionic compound (B). In the present invention, therefore, the ionic compound (B) preferably contains a lithium ion particularly in view of the moisture durability of the antistatic function.

Examples of the ionic compound (B) as an alkali metal salt include lithium bis(heptafluoropropanesulfonyl)imide, sodium bis(heptafluoropropanesulfonyl)imide, potassium bis(heptafluoropropanesulfonyl)imide, lithium bis(nonafluorobutanesulfonyl)imide, sodium bis(nonafluorobutanesulfonyl)imide, potassium bis(nonafluorobutanesulfonyl)imide, lithium cyclo-hexafluoropropane-1,3-bis(sulfonyl)imide, sodium cyclo-hexafluoropropane-1,3-bis(sulfonyl)imide, potassium cyclo-hexafluoropropane-1,3-bis(sulfonyl)imide, dilithium 1,1,2,2,3,3-hexafluoropropane-1,3-disulfonate, disodium 1,1,2,2,3,3-hexafluoropropane-1,3-disulfonate, and dipotassium 1,1,2,2,3,3-hexafluoropropane-1,3-disulfonate. Among them, particularly preferred are lithium bis(heptafluoropropanesulfonyl)imide, lithium bis(nonafluorobutanesulfonyl)imide, lithium cyclo-hexafluoropropane-1,3-bis(sulfonyl)imide and dilithium 1,1,2,2,3,3-hexafluoropropane-1,3-disulfonate.

The cation component of the ionic compound (B) may also be an organic cation, which forms, together with the anion component, an organic cation-anion salt as the ionic compound (B). The organic cation-anion salt is also called an ionic liquid or an ionic solid. Examples of the organic cation include a pyridinium cation, a piperidinium cation, a pyrrolidinium cation, a pyrroline skeleton-containing cation, a pyrrole skeleton-containing cation, an imidazolium cation, a tetrahydropyrimidinium cation, a dihydropyrimidinium cation, a pyrazolium cation, a pyrazolinium cation, a tetraalkylammonium cation, a trialkylsulfonium cation, and a tetraalkylphosphonium cation.

Compounds composed of combinations of any of the above cation components and any of the above anion components may be appropriately selected and used as examples of the organic cation-anion salt. Such examples include 1-butyl-3-methylpyridinium bis(heptafluoropropanesulfonyl)imide, 1-butyl-3-methylpyridinium bis(nonafluorobutanesulfonyl)imide, 1-butyl-3-methylpyridinium cyclo-hexafluoropropane-1,3-bis(sulfonyl)imide, bis(1-butyl-3-methylpyridinium)hexafluoropropane-1,3-disulfonate, 1-ethyl-3-methylimidazolium bis(heptafluoropropanesulfonyl)imideimide, 1-ethyl-3-methylimidazolium bis(nonafluorobutanesulfonyl)imide, 1-ethyl-3-methylimidazolium cyclo-hexafluoropropane-1,3-bis(sulfonyl)imide, and bis(1-ethyl-3-methylpyridinium)hexafluoropropane-1,3-disulfonate.

The content of the ionic compound (B) in the pressure-sensitive adhesive composition of the present invention is preferably from 0.001 to 10 parts by weight based on 100 parts by weight of the hydroxyl group-containing (meth) acryl-based polymer (A). If the content of the ionic compound (B) is less than 0.001 parts by weight, the effect of improving the antistatic performance may be insufficient. The content of the ionic compound (B) is preferably 0.1 parts by weight or more, more preferably 0.5 parts by weight or more. If the content of the ionic compound (B) is more than 10 parts by weight, the durability may be insufficient. The content of the compound (B) is preferably 5 parts by weight or less, more preferably 3 parts by weight or less. The preferred range of the content of the ionic compound (B) may be determined based on the above upper and lower limit values.

The pressure-sensitive adhesive composition of the present invention may further contain (C) a crosslinking agent. The crosslinking agent (C) may be an organic crosslinking agent or a polyfunctional metal chelate. Examples of the organic crosslinking agent include an isocyanate crosslinking agent, a peroxide crosslinking agent, an epoxy crosslinking agent, an imine crosslinking agent, etc. The polyfunctional metal chelate is a compound containing a polyvalent metal covalently or coordinately bonded to an organic compound. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include an alkyl ester, an alcohol compound, a carboxylic acid compound, an ether compound, and a ketone compound.

The crosslinking agent (C) is preferably an isocyanate crosslinking agent and/or a peroxide crosslinking agent. Examples of compounds for use as isocyanate crosslinking agents include isocyanate monomers such as tolylene diisocyanate, chlorophenylene diisocyanate, tetramethylene diisocyanate, xylylene diisocyanate, diphenylmethane diisocyanate, and hydrogenated diphenylmethane diisocyanate, and isocyanate compounds, isocyanurate compounds, or biuret compounds produced by adding any of these isocyanate monomers to trimethylolpropane or other compounds; and urethane prepolymer type isocyanates produced by addition reaction of any of these isocyanate compounds with polyether polyols, polyester polyols, acrylic polyols, polybutadiene polyols, polyisoprene polyols, or other polyols. Particularly preferred is a polyisocyanate compound such as one selected from the group consisting of hexamethylene diisocyanate, hydrogenated xylylene diisocyanate, and isophorone diisocyanate, or a derivative thereof. Examples of one selected from the group consisting of hexamethylene diisocyanate, hydrogenated xylylene diisocyanate, and isophorone diisocyanate, or a derivative thereof (a polyisocyanate compound) include hexamethylene diisocyanate, hydrogenated xylylene diisocyanate, isophorone diisocyanate, polyol-modified hexamethylene diisocyanate, polyol-modified hydrogenated xylylene diisocyanate, trimer-type hydrogenated xylylene diisocyanate, and polyol-modified isophorone diisocyanate. The listed polyisocyanate compounds are preferred because their reaction with a hydroxyl group quickly proceeds as if an acid or a base contained in the polymer acts as a catalyst, which particularly contributes to the rapidness of the crosslinking.

Any peroxide capable of generating active radical species upon heating or exposure to light and capable of crosslinking the base polymer in the pressure-sensitive adhesive composition can be used appropriately. In view of workability or stability, a peroxide with a one-minute half-life temperature of 80° C. to 160° C. is preferably used, and a peroxide with a one-minute half-life temperature of 90° C. to 140° C. is more preferably used.

Examples of peroxides that may be used include di(2-ethylhexyl)peroxydicarbonate (one-minute half-life temperature: 90.6° C.), di(4-tert-butylcyclohexyl)peroxydicarbonate (one-minute half-life temperature: 92.1° C.), di-sec-butyl peroxydicarbonate (one-minute half-life temperature: 92.4° C.), tert-butyl peroxyneodecanoat (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoyl peroxide (one-minute half-life temperature: 117.4° C.), 1,1,3,3-tetramethylbutylperoxy-2-ethyl hexanoate (one-minute half-life temperature: 124.3° C.), di(4-methylbenzoyl)peroxide (one-minute half-life temperature: 128.2° C.), dibenzoyl peroxide (one-minute half-life temperature: 130.0° C.), tert-butyl peroxyisobutyrate (one-minute half-life temperature: 136.1° C.), and 1,1-di(tert-hexylperoxy)cyclohexane (one-minute half-life temperature: 149.2° C.). In particular, di(4-tert-butylcyclohexyl) peroxydicarbonate (one-minute half-life temperature: 92.1° C.), dilauroyl peroxide (one-minute half-life temperature: 116.4° C.), and dibenzoyl peroxide (one-minute half-life temperature: 130.0° C.) are preferably used because they can provide higher crosslinking reaction efficiency.

The half life of a peroxide, which is an indicator of how fast the peroxide can be decomposed, refers to the time required for the remaining amount of the peroxide to reach one half of the original amount. The decomposition temperature required for a certain half life time and the half life time obtained at a certain temperature are shown in catalogs furnished by manufacturers, such as Organic Peroxide Catalog, 9th Edition, May, 2003, furnished by NOF CORPORATION.

The crosslinking agent (C) is preferably used in an amount of 0.01 to 20 parts by weight, more preferably 0.03 to 10 parts by weight, based on 100 parts by weight of the hydroxyl group-containing (meth)acryl-based polymer (A). If the amount of the crosslinking agent (C) is less than 0.01 parts by weight, the pressure-sensitive adhesive may tend to have insufficient cohesive strength, and foaming may occur during the heating of the composition. On the other hand, if it is more than 20 parts by weight, the pressure-sensitive adhesive may have insufficient moisture resistance and may easily peel off in a reliability test or the like.

The above isocyanate crosslinking agents may be used singly or in combination of two or more. The total content of the isocyanate crosslinking agent(s) is preferably from 0.01 to 2 parts by weight, more preferably from 0.02 to 2 parts by weight, even more preferably from 0.05 to 1.5 parts by weight, based on 100 parts by weight of the hydroxyl group-containing (meth)acryl-based polymer (A). The content may be appropriately determined taking into account cohesive strength, the ability to prevent delamination in a durability test, or other properties.

The above peroxides may be used singly or in combination of two or more. The total content of the peroxide(s) is preferably from 0.01 to 2 parts by weight, more preferably from 0.04 to 1.5 parts by weight, even more preferably from 0.05 to 1 part by weight, based on 100 parts by weight of the hydroxyl group-containing (meth)acryl-based polymer (A). The content may be appropriately selected in these ranges for control of workability, reworkability, crosslinking stability, removability, or other properties.

For example, the amount of decomposition of the peroxide can be determined by a method of measuring the peroxide residue after the reaction process by high performance liquid chromatography (HPLC).

More specifically, for example, after the reaction process, about 0.2 g of each pressure-sensitive adhesive composition is taken out and immersed in 10 ml of ethyl acetate and subjected to shaking extraction at 25° C. and 120 rpm for 3 hours in a shaker, and then allowed to stand at room temperature for 3 days. Subsequently, 10 ml of acetonitrile is added, and the mixture is shaken at 25° C. and 120 rpm for 30 minutes. About 10 µl of the liquid extract obtained by filtration through a membrane filter (0.45 µm) is subjected to HPLC by injection and analyzed so that the amount of the peroxide after the reaction process is determined.

The pressure-sensitive adhesive composition of the present invention may further contain (D) a silane coupling agent. Durability can be improved by using the silane coupling agent (D). Examples of the silane coupling agent include epoxy group-containing silane coupling agents such as 3-glycidoxypropyltrimethoxysilane 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-2-(aminoethyl)-3-aminopropylmethyldimethoxysilane, 3-triethoxysilyl-N-(1,3-dimethylbutylidene)propylamine, and N-phenyl-γ-aminopropyltrimethoxysilane; (meth)acrylic group-containing silane coupling agents such as 3-acryloxypropyltrimethoxysilane and 3-methacryloxypropyltriethoxysilane; and isocyanate group-containing silane coupling agents such as 3-isocyanatopropyltriethoxysilane.

These may be used singly or in combination of two or more as the silane coupling agent (D). The total content of the silane coupling agent(s) is preferably from 0.001 to 5 parts by weight, more preferably from 0.01 to 1 part by weight, even more preferably from 0.02 to 1 part by weight, further more preferably from 0.05 to 0.6 parts by weight, based on 100 parts by weight of the hydroxyl group-containing (meth)acryl-based polymer (A). The silane coupling agent(s) should be used in such an amount as to improve durability and keep a suitable level of adhering strength to optical members such as liquid crystal cells.

The pressure-sensitive adhesive composition of the present invention may further contain (E) a polyether-modified silicone. For example, the compound disclosed in JP-A-2010-275522 may be used as the polyether-modified silicone (E).

The polyether-modified silicone (E) may have a polyether skeleton and a reactive silyl group at least one end, wherein the reactive silyl group is represented by the following general formula (3): —$SiR_aM_{3-a}$, wherein R is a monovalent organic group having 1 to 20 carbon atoms and optionally having a substituent, M is a hydroxyl group or a hydrolyzable group, and a is an integer of 0 to 2. In the formula, two or more R groups, if any, may be the same or different, and two or more M groups, if any, may be the same or different.

The polyether-modified silicone (E) may be a compound represented by the general formula (4): $R_aM_{3-a}$Si—X—Y—$(AO)_n$—Z, wherein R is a monovalent organic group having 1 to 20 carbon atoms and optionally having a substituent, M is a hydroxyl group or a hydrolyzable group, and a is an integer of 0 to 2. In the formula, two or more R groups, if any, may be the same or different, and two or more M groups, if any, may be the same or different. AO is a straight- or branched-chain oxyalkylene group of 1 to 10 carbon atoms, and n is the average number of moles of the added oxyalkylene group and is from 1 to 1,700. X is a straight- or branched-chain alkylene group of 1 to 20 carbon atoms. Y is an ether bond, an ester bond, a urethane bond, or a carbonate bond.

Z is a hydrogen atom, a monovalent hydrocarbon group of 1 to 10 carbon atoms, a group represented by the general formula (4A): —$Y_1$—X—$SiR_aM_{3-a}$, wherein R, M, X, and a have the same meanings as defined above, and $Y^1$ is a single bond, a —CO— bond, a —CONH- bond, or a —COO— bond, or a group represented by the general formula (4B): -Q{-$(OA)_n$-Y—X—$SiR_aM_{3-a}\}_m$, wherein R, M, X, Y, and a have the same meanings as defined above, OA has the same meaning as AO defined above, n has the same meaning as defined above, Q is a divalent or polyvalent hydrocarbon group of 1 to 10 carbon atoms, and m is a number that is the same as the valence of the hydrocarbon group.

Examples of the polyether-modified silicone (E) include MS Polymers S203, S303, and S810 manufactured by Kaneka Corporation; SILYL EST250 and EST280 manufactured by Kaneka Corporation; SILYL SAT10, SILYL SAT200, SILYL SAT220, SILYL SAT350, and SILYL SAT400 manufactured by Kaneka Corporation; and EXCESTAR S2410, S2420, or S3430 manufacture by ASAHI GLASS CO., LTD.

The pressure-sensitive adhesive composition of the present invention may further contain any other known additive such as a powder of a colorant, a pigment, or the like, a dye, a surfactant, a plasticizer, a tackifier, a surface lubricant, a leveling agent, a softening agent, an antioxidant, an age resistor, a light stabilizer, an ultraviolet absorber, a polymerization inhibitor, an inorganic or organic filler, a metal powder, or a particulate or flaky material, which may be added as appropriate depending on the intended use. Within the controllable range, a reducing agent may also be added to form a redox system.

When the pressure-sensitive adhesive composition is used to form a pressure-sensitive adhesive layer, it is preferred that the total content of the crosslinking agent should be controlled and that the effect of the crosslinking temperature or the crosslinking time should be carefully taken into account.

The crosslinking temperature and the crosslinking time may be controlled depending on the type of the crosslinking agent to be used. The crosslinking temperature is preferably 170° C. or lower.

The crosslinking process may be performed at the temperature where the process of drying the pressure-sensitive adhesive layer is performed, or an independent crosslinking process may be performed after the drying process.

The crosslinking time may be determined in view of productivity or workability. The crosslinking time is generally from about 0.2 to about 20 minutes, preferably from about 0.5 to about 10 minutes.

The pressure-sensitive adhesive layer-attached polarizing film of the present invention includes a polarizing film and a pressure-sensitive adhesive layer formed on at least one side of the polarizing film and made from the pressure-sensitive adhesive composition.

For example, the pressure-sensitive adhesive layer can be formed by a method including applying the pressure-sensitive adhesive composition to a release-treated separator or the like, removing the polymerization solvent and so on from the composition by drying to form a pressure-sensitive adhesive layer, and then transferring the pressure-sensitive adhesive layer onto a polarizing film. Alternatively, the pressure-sensitive adhesive layer can be formed by a method including applying the pressure-sensitive adhesive composition to a polarizing film and removing the polymerization solvent and so on from the composition by drying to form a pressure-sensitive adhesive layer on the polarizing film. In the process of applying the pressure-sensitive adhesive, if necessary, one or more solvents other than the polymerization solvent may be newly added to the composition.

A silicone release liner is preferably used as the release-treated separator. The adhesive composition of the present invention may be applied to such a liner and dried to form a pressure-sensitive adhesive layer. In this process, any appropriate method may be used for drying the pressure-sensitive adhesive, depending on the purpose. Preferably, a method of heating and drying the coating is used. The heating and drying temperature is preferably from 40° C. to 200° C., more preferably from 50° C. to 180° C., even more preferably from 70° C. to 170° C. When the heating temperature falls within the range, a pressure-sensitive adhesive with a high level of adhesive properties can be obtained.

The drying may be performed for any appropriate time. The drying time is preferably from 5 seconds to 20 minutes, more preferably from 5 seconds to 10 minutes, even more preferably from 10 seconds to 5 minutes.

The surface of the polarizing film may also be covered with an anchor layer or subjected to any adhesion facilitating treatment such as a corona treatment or a plasma treatment before the pressure-sensitive adhesive layer is formed thereon. The surface of the pressure-sensitive adhesive layer may also be subjected to an adhesion facilitating treatment.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is typically, but not limited to, about 1 to about 100 µm, preferably 2 to 50 µm, more preferably 2 to 40 µm, even more preferably 5 to 35 µm.

When the surface of the pressure-sensitive adhesive layer is exposed, the pressure-sensitive adhesive layer may be protected by a release-treated sheet (separator) until it is actually used.

Examples of the material used to form such a separator include a plastic film such as a polyethylene, polypropylene, polyethylene terephthalate, or polyester film, a porous material such as paper, cloth, or nonwoven fabric, and appropriate thin materials such as a net, a foamed sheet, a metal foil, and a laminate thereof. A plastic film is advantageously used because of its good surface smoothness.

Such a plastic film may be of any type capable of protecting the pressure-sensitive adhesive layer. For example, such a plastic film may be a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, or an ethylene-vinyl acetate copolymer film.

The separator generally has a thickness of about 5 to about 200 µm, preferably about 5 to about 100 µm. If necessary, the separator may be subjected to a release treatment and an anti-pollution treatment with a silicone, fluoride, long-chain alkyl, or fatty acid amide release agent, a silica powder or the like, or subjected to an antistatic treatment of coating type, kneading and mixing type, vapor-deposition type, or the like. In particular, when the surface of the separator is appropriately subjected to a release treatment such as a silicone treatment, a long-chain alkyl treatment, or a fluorine treatment, the releasability from the pressure-sensitive adhesive layer can be further improved.

The release-treated sheet used in the preparation of the pressure-sensitive adhesive layer-attached polarizing film may be used by itself as a separator for the pressure-sensitive adhesive layer-attached polarizing film, so that the process can be simplified.

The pressure-sensitive adhesive layer-attached polarizing film according to the present invention includes at least a polarizing film and the pressure-sensitive adhesive layer described above. The polarizing film used generally includes a polarizer and a transparent protective film or films provided on one or both sides of the polarizer.

Any of various polarizers may be used without restriction. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film or may be a polyene-based oriented film such as a film of a dehydration product of polyvinyl alcohol or a dehydrochlorination product of polyvinyl chloride. In particular, a polarizer including a polyvinyl alcohol-based film and a dichroic material such as iodine is advantageous. The thickness of the polarizer is generally, but not limited to, about 80 µm or less.

For example, a polarizer including a uniaxially-stretched polyvinyl alcohol-based film dyed with iodine can be produced by a process including immersing a polyvinyl alcohol (film) in an aqueous iodine solution to dye the film and stretching the film to 3 to 7 times the original length. If necessary, the film may also be immersed in an aqueous solution of potassium iodide or the like optionally containing boric acid, zinc sulfate, zinc chloride, or other materials. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

A thin polarizer with a thickness of 10 µm or less may also be used. In view of thickness reduction, the thickness is preferably from 1 to 7 µm. Such a thin polarizer is less uneven in thickness, has good visibility, and is less dimensionally-variable, and thus has high durability. It is also preferred because it can form a thinner polarizing film.

Typical examples of such a thin polarizer include the thin polarizing films described in JP-A-51-069644, JP-A-2000-338329, WO2010/100917 A, PCT/JP2010/001460, Japanese Patent Application No. 2010-269002, and Japanese Patent Application No. 2010-263692. These thin polarizing films can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

Among processes including the steps of stretching and dyeing a laminate, a process capable of achieving high-ratio stretching to improve polarizing performance is preferably used when the thin polarizing film is formed. Thus, the thin polarizing film is preferably obtained by a process including the step of stretching in an aqueous boric acid solution as described in WO2010/100917 A, PCT/JP2010/001460, Japanese Patent Application No. 2010-269002, or Japanese Patent Application No. 2010-263692, and more preferably obtained by a process including the step of performing auxiliary in-air stretching before stretching in an aqueous boric acid solution as described in Japanese Patent Application No. 2010-269002 or 2010-263692.

PCT/JP2010/001460 describes a thin highly-functional polarizing film that is formed integrally with a resin substrate, made of a PVA-based resin containing an oriented dichroic material, and has a thickness of 7 µm or less and the optical properties of a single transmittance of 42.0% or more and a degree of polarization of 99.95% or more.

This thin highly-functional polarizing film can be produced by a process including forming a PVA-based resin coating on a resin substrate with a thickness of at least 20 µm, drying the coating to form a PVA-based resin layer, immersing the resulting PVA-based resin layer in a dyeing liquid containing a dichroic material to adsorb the dichroic material to the PVA-based resin layer, and stretching the PVA-based resin layer, which contains the adsorbed dichroic material, together with the resin substrate in an aqueous boric acid solution to a total stretch ratio of 5 times or more the original length.

A laminated film including a thin highly-functional polarizing film containing an oriented dichroic material can also be produced by a method including the steps of: applying a PVA-based resin-containing aqueous solution to one side of a resin substrate with a thickness of at least 20 µm, drying the coating to form a PVA-based resin layer so that a laminated film including the resin substrate and the PVA-based resin layer formed thereon is produced; immersing the laminated film in a dyeing liquid containing a dichroic material to adsorb the dichroic material to the PVA-based resin layer in the laminated film, wherein the laminated film includes the resin substrate and the PVA-based resin layer formed on one side of the resin substrate; and stretching the laminated film, which has the PVA-based resin layer containing the adsorbed dichroic material, in an aqueous boric acid solution to a total stretch ratio of 5 times or more the original length, wherein the PVA-based resin layer containing the adsorbed dichroic material is stretched together with the resin substrate, so that a laminated film including the resin substrate and a thin highly-functional polarizing film formed on one side of the resin substrate is produced, in which the thin highly-functional polarizing film is made of the PVA-based resin layer containing the oriented dichroic material and has a thickness of 7 µm or less and the optical properties of a single transmittance of 42.0% or more and a degree of polarization of 99.95% or more.

In the present invention, the polarizer with a thickness of 10 µm or less used to form the pressure-sensitive adhesive layer-attached polarizing film may be a polarizing film in the form of a continuous web including a PVA-based resin containing an oriented dichroic material. Such a polarizing film can be obtained by a two-stage stretching process including auxiliary in-air stretching of a laminate including a thermoplastic resin substrate and a polyvinyl alcohol-based resin layer formed thereon and stretching of the laminate in an aqueous boric acid solution. The thermoplastic resin substrate is preferably an amorphous ester-based thermoplastic resin substrate or a crystalline ester-based thermoplastic resin substrate.

The thin polarizing film disclosed in Japanese Patent Application No. 2010-269002 or 2010-263692 is a polarizing film in the form of a continuous web including a PVA-based resin containing an oriented dichroic material, which is made with a thickness of 10 µm or less by a two-stage stretching process including auxiliary in-air stretching of a laminate and stretching of the laminate in an aqueous boric acid solution, wherein the laminate includes an amorphous ester-based thermoplastic resin substrate and a PVA-based resin layer formed thereon. This thin polarizing film is preferably made to have optical properties satisfying the following conditions: $P \geq -(10^{0.929T-42.4}-1) \times 100$ (provided that $T<42.3$) and $P \geq 99.9$ (provided that $T \geq 42.3$), wherein T represents the single transmittance, and P represents the degree of polarization.

Specifically, the thin polarizing film can be produced by a thin polarizing film-manufacturing method including the steps of: performing elevated temperature in-air stretching of a PVA-based resin layer formed on an amorphous ester-based thermoplastic resin substrate in the form of a continuous web, so that a stretched intermediate product including an oriented PVA-based resin layer is produced; adsorbing a dichroic material (which is preferably iodine or a mixture of iodine and an organic dye) to the stretched intermediate product to produce a dyed intermediate product including the PVA-based resin layer and the dichroic material oriented therein; and performing stretching of the dyed intermediate product in an aqueous boric acid solution so that a polarizing film with a thickness of 10 µm or less is produced, which includes the PVA-based resin layer and the dichroic material oriented therein.

In this manufacturing method, the elevated temperature in-air stretching and the stretching in an aqueous boric acid solution are preferably performed in such a manner that the PVA-based resin layer formed on the amorphous ester-based thermoplastic resin substrate is stretched to a total stretch ratio of 5 times or more. The temperature of the aqueous boric acid solution for the stretching therein may be 60° C. or higher. Before stretched in the aqueous boric acid solution, the dyed intermediate product is preferably subjected to an insolubilization treatment, in which the dyed intermediate product is preferably immersed in an aqueous boric acid solution at a temperature of 40° C. or lower. The amorphous ester-based thermoplastic resin substrate may be made of amorphous polyethylene terephthalate including co-polyethylene terephthalate in which isophthalic acid, cyclohexanedimethanol, or any other monomer is copolymerized. The amorphous ester-based thermoplastic resin substrate is preferably made of a transparent resin. The thickness of the substrate may be at least seven times the thickness of the PVA-based resin layer to be formed. The elevated temperature in-air stretching is preferably performed at a stretch ratio of 3.5 times or less. The temperature of the elevated temperature in-air stretching is preferably equal to or higher than the glass transition temperature of the PVA-based resin. Specifically, it is preferably in the range of 95° C. to 150° C. When the elevated temperature in-air stretching is end-free uniaxial stretching, the PVA-based resin layer formed on the amorphous ester-based thermoplastic resin substrate is preferably stretched to a total stretch ratio of 5 to 7.5 times both inclusive. When the elevated temperature in-air stretching is fixed-end uniaxial stretching, the PVA-based resin layer formed on the amorphous ester-based thermoplastic resin substrate is preferably stretched to a total stretch ratio of 5 to 8.5 times both inclusive.

More specifically, the thin polarizing film can be produced by the method described below.

A substrate is prepared in the form of a continuous web, which is made of co-polyethylene terephthalate-isophthalate (amorphous PET) containing 6 mol % of copolymerized isophthalic acid. The amorphous PET has a glass transition temperature of 75° C. A laminate of a polyvinyl alcohol (PVA) layer and the amorphous PET substrate in the form of a continuous web is prepared as described below. For reference, the glass transition temperature of PVA is 80° C.

A 200-µm-thick amorphous PET substrate is provided, and an aqueous 4-5% PVA solution is prepared by dissolving a PVA powder with a polymerization degree of 1,000 or more and a saponification degree of 99% or more in water. Subsequently, the aqueous PVA solution is applied to the 200-µm-thick amorphous PET substrate and dried at a temperature of 50 to 60° C. so that a laminate composed of the amorphous PET substrate and a 7-µm-thick PVA layer formed thereon is obtained.

The laminate having the 7-µm-thick PVA layer is subjected to a two-stage stretching process including auxiliary in-air stretching and stretching in an aqueous boric acid solution as described below, so that a thin highly-functional polarizing film with a thickness of 3 µm is obtained. At the first stage, the laminate having the 7-µm-thick PVA layer is subjected to an auxiliary in-air stretching step so that the layer is stretched together with the amorphous PET substrate to form a stretched laminate having a 5-µm-thick PVA layer. Specifically, the stretched laminate is formed by a process including feeding the laminate having the 7-µm-thick PVA layer to a stretching apparatus placed in an oven with the stretching temperature environment set at 130° C. and subjecting the laminate to end-free uniaxial stretching to a stretch ratio of 1.8 times. In the stretched laminate, the PVA layer is modified, by the stretching, into a 5-μm-thick PVA layer containing oriented PVA molecules.

Subsequently, a dyeing step is performed to produce a dyed laminate having a 5-μm-thick PVA layer containing oriented PVA molecules and adsorbed iodine. Specifically, the dyed laminate is produced by immersing the stretched laminate for a certain period of time in a dyeing liquid containing iodine and potassium iodide and having a temperature of 30° C. so that iodine can be adsorbed to the PVA layer of the stretched laminate and so that the PVA layer for finally forming a highly-functional polarizing film can have a single transmittance of 40 to 44%. In this step, the dyeing liquid contains water as a solvent and iodine at a concentration in the range of 0.12 to 0.30% by weight, and potassium iodide at a concentration in the range of 0.7 to 2.1% by weight. The concentration ratio of iodine to potassium iodide is 1:7. It should be noted that potassium iodide is necessary to make iodine soluble in water. More specifically, the stretched laminate is immersed for 60 seconds in a dyeing liquid containing 0.30% by weight of iodine and 2.1% by weight of potassium iodide, so that a dyed laminate is produced, in which the 5-μm-thick PVA layer contains oriented PVA molecules and adsorbed iodine.

At the second stage, the dyed laminate is further subjected to a stretching step in an aqueous boric acid solution so that the layer is further stretched together with the amorphous PET substrate to form an optical film laminate having a 3-μm-thick PVA layer, which forms a highly-functional polarizing film. Specifically, the optical film laminate is formed by a process including feeding the dyed laminate to a stretching apparatus placed in a treatment system where an aqueous boric acid solution containing boric acid and potassium iodide is set in the temperature range of 60 to 85° C., and subjecting the laminate to end-free uniaxial stretching to a stretch ratio of 3.3 times. More specifically, the aqueous boric acid solution has a temperature of 65° C. In the solution, the boric acid content and the potassium iodide content are 4 parts by weight and 5 parts by weight, respectively, based on 100 parts by weight of water. In this step, the dyed laminate having a controlled amount of adsorbed iodine is first immersed in the aqueous boric acid solution for 5 to 10 seconds. Subsequently, the dyed laminate is directly fed between a plurality of pairs of rolls different in peripheral speed, which form the stretching apparatus placed in the treatment system, and subjected to end-free uniaxial stretching for 30 to 90 seconds to a stretch ratio of 3.3 times. This stretching treatment converts the PVA layer of the dyed laminate to a 3-μm-thick PVA layer in which the adsorbed iodine forms a polyiodide ion complex highly oriented in a single direction. This PVA layer forms a highly-functional polarizing film in the optical film laminate.

A cleaning step, although not essential for the manufacture of the optical film laminate, is preferably performed, in which the optical film laminate is taken out of the aqueous boric acid solution, and boric acid deposited on the surface of the 3-μm-thick PVA layer formed on the amorphous PET substrate is washed off with an aqueous potassium iodide solution. Subsequently, the cleaned optical film laminate is dried in a drying step using warm air at 60° C. It should be noted that the cleaning step is to prevent appearance defects such as boric acid precipitation.

A lamination and/or transfer step, although not essential for the manufacture of the optical film laminate, may also be performed, in which an 80-μm-thick triacetylcellulose film is bonded to the surface of the 3-w-thick PVA layer formed on the amorphous PET substrate while an adhesive is applied to the surface, and then the amorphous PET substrate is peeled off, so that the 3-μm-thick PVA layer can be transferred onto the 80-μm-thick triacetylcellulose film.

[Other Steps]

The thin polarizing film-manufacturing method may include other steps in addition to the above steps. For example, such other steps may include an insolubilization step, a crosslinking step, a drying step (moisture control), etc. Other steps may be performed at any appropriate timing.

The insolubilization step is typically achieved by immersing the PVA-based resin layer in an aqueous boric acid solution. The insolubilization treatment can impart water resistance to the PVA-based resin layer. The concentration of boric acid in the aqueous boric acid solution is preferably from 1 to 4 parts by weight based on 100 parts by weight of water. The insolubilization bath (aqueous boric acid solution) preferably has a temperature of 20° C. to 50° C. Preferably, the insolubilization step is performed after the preparation of the laminate and before the dyeing step or the step of stretching in water.

The crosslinking step is typically achieved by immersing the PVA-based resin layer in an aqueous boric acid solution. The crosslinking treatment can impart water resistance to the PVA-based resin layer. The concentration of boric acid in the aqueous boric acid solution is preferably from 1 to 4 parts by weight based on 100 parts by weight of water. When the crosslinking step is performed after the dyeing step, an iodide is preferably added to the solution. The addition of an iodide can suppress the elution of adsorbed iodine from the PVA-based resin layer. The amount of the addition of an iodide is preferably from 1 to 5 parts by weight based on 100 parts by weight of water. Examples of the iodide include those listed above. The temperature of the crosslinking bath (aqueous boric acid solution) is preferably from 20° C. to 50° C. Preferably, the crosslinking step is performed before the second stretching step in the aqueous boric acid solution. In a preferred embodiment, the dyeing step, the crosslinking step, and the second stretching step in the aqueous boric acid solution are performed in this order.

The material used to form the transparent protective film is typically thermoplastic resin with a high level of transparency, mechanical strength, thermal stability, water blocking properties, isotropy, etc. Examples of such thermoplastic resin include cellulose resin such as triacetylcellulose, polyester resin, polyethersulfone resin, polysulfone resin, polycarbonate resin, polyamide resin, polyimide resin, polyolefin resin, (meth)acrylic resin, cyclic polyolefin resin (norbornene resin), polyarylate resin, polystyrene resin, polyvinyl alcohol resin, and any blend thereof. The transparent protective film may be bonded to one side of the polarizer with an adhesive layer. In this case, thermosetting or ultraviolet-curable resin such as (meth)acrylic, urethane, acrylic urethane, epoxy, or silicone resin may be used to form a transparent protective film on the other side. The transparent protective film may contain any one or more appropriate additives. Examples of such an additive include an ultraviolet absorber, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, even more preferably from 60 to 98% by weight, further more preferably from 70 to 97% by weight. If the content of the thermoplastic resin in the transparent protective film is less than 50% by weight, high transparency and other properties inherent in the thermoplastic resin may be insufficiently exhibited.

The polarizer and the transparent protective film may be bonded together with an adhesive. Examples of such an adhesive include isocyanate adhesives, polyvinyl alcohol-based adhesives, gelatin-based adhesives, vinyl-based latex-based, and aqueous polyester adhesives. The adhesive is generally used in the form of an aqueous adhesive solution, which generally has a solids content of 0.5 to 60% by weight. Besides the above, ultraviolet-curable adhesives, electron beam-curable adhesives, or the like may also be used to bond the polarizer and the transparent protective film together. Electron beam-curable adhesives for use on polarizing films have good tackiness to the various transparent protective films described above. The adhesive for use in the present invention may also contain a metal compound filler.

The polarizing film and any other optical film or films may be placed on one another to form a laminate. Examples of such other optical films include a reflector, a transflector, a retardation plate (including a wavelength plate such as a half or quarter wavelength plate), a viewing angle compensation film, a brightness enhancement film, and any other optical layer that can be used to form a liquid crystal display device or the like. One or more layers of any of these optical components may be used together with the polarizing film to form a laminate for practical use.

The optical film including a laminate of the polarizing film and the optical layer may be formed by a method of stacking them one by one in the process of manufacturing a liquid crystal display device or the like. However, an optical film formed in advance by lamination is advantageous in that it can facilitate the process of manufacturing a liquid crystal display device or the like because it has stable quality and good assembling workability. In the lamination, any appropriate bonding means such as a pressure-sensitive adhesive layer may be used. When the polarizing film and any other optical layer are bonded together, their optical axes may be each aligned at an appropriate angle, depending on the desired retardation properties or other desired properties.

The pressure-sensitive adhesive layer-attached polarizing film of the present invention may be preferably used to form a variety of image display devices such as liquid crystal display devices. Liquid crystal display devices may be formed according to conventional techniques. Specifically, a liquid crystal display device may be typically formed using any conventional technique including properly assembling a display panel such as a liquid crystal cell, a pressure-sensitive adhesive layer-attached polarizing film, and optional components such as lighting system components, and incorporating a driving circuit, except that the pressure-sensitive adhesive layer-attached polarizing film used is according to the present invention. The liquid crystal cell to be used may also be of any type such as TN type, STN type, π type, VA type, or IPS type.

Any desired liquid crystal display device may be formed, such as a liquid crystal display device including a display panel such as a liquid crystal cell and the pressure-sensitive adhesive layer-attached polarizing film or plates placed on one or both sides of the display panel, or a liquid crystal display device further including a backlight or a reflector in a lighting system. In such a case, the pressure-sensitive adhesive layer-attached polarizing film or plates according to the present invention may be placed on one or both sides of a display panel such as a liquid crystal cell. When the optical films are provided on both sides, they may be the same or different. The process of forming a liquid crystal display device may also include placing an appropriate component such as a diffusion plate, an antiglare layer, an anti-reflection film, a protective plate, a prism array, a lens array sheet, a light diffusion plate, or a backlight in one or more layers at an appropriate position or positions.

EXAMPLES

Hereinafter, the present invention will be specifically described with reference to examples, which, however, are not intended to limit the present invention. In each example, "parts" and "%" are all by weight unless otherwise specified.

<Measurement of Weight Average Molecular Weight of Hydroxyl Group-Containing (Meth)Acryl-Based Polymer (A)>

The weight average molecular weight of the hydroxyl group-containing (meth)acryl-based polymer (A) was determined using gel permeation chromatography (GPC).

Analyzer: HLC-8120GPC manufactured by TOSOH CORPORATION

Columns: G7000$H_{XL}$+GMH$_{YZ}$+GMH$_{XL}$ manufactured by TOSOH CORPORATION

Column size: each 7.8 mmφ×30 cm, 90 cm in total

Column temperature: 40° C.

Flow rate: 0.8 ml/minute

Injection volume: 100 µl

Eluent: tetrahydrofuran

Detector: differential refractometer (RI)

Standard sample: polystyrene

<Preparation of Polarizing Film (1)>

An 80-µm-thick polyvinyl alcohol film was stretched to 3 times between rolls different in velocity ratio while it was dyed in a 0.3% iodine solution at 30° C. for 1 minute. The film was then stretched to a total stretch ratio of 6 times while it was immersed in an aqueous solution containing 4% of boric acid and 10% of potassium iodide at 60° C. for 0.5 minutes. Subsequently, the film was washed by immersion in an aqueous solution containing 1.5% of potassium iodide at 30° C. for 10 seconds and then dried at 50° C. for 4 minutes to give a 20-µm-thick polarizer. Saponified triacetylcellulose films each with a thickness of 40 µm were bonded to both sides of the polarizer with a polyvinyl alcohol-based adhesive to form a polarizing film. Hereinafter, this product will be referred to as a TAC-based polarizing film (1).

Production Example 1

Preparation of Hydroxyl Group-Containing (Meth)acryl-Based Polymer (A-1)

A reaction vessel equipped with a condenser tube, a nitrogen introducing tube, a thermometer, and a stirrer was charged with 99 parts of butyl acrylate, 1 part of 4-hydroxybutyl acrylate (HBA), and 1 part of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing a hydroxyl group-containing (meth)acryl-based polymer (A-1) with a weight average molecular weight of 1,000,000 (solid concentration: 30% by weight).

Production Example 2

Preparation of Hydroxyl Group-Containing (Meth)acryl-Based Polymer (A-2)

A solution of a hydroxyl group-containing (meth)acryl-based polymer (A-2) with a weight average molecular weight of 1,100,000 was prepared in the same manner as in Production Example 1, except that a monomer mixture containing 97 parts of butyl acrylate and 3 parts of 4-hydroxybutyl acrylate was used instead in Production Example 1.

Production Example 3

Preparation of Hydroxyl Group-Containing (Meth)acryl-Based Polymer (A-3)

A solution of a hydroxyl group-containing (meth)acryl-based polymer (A-3) with a weight average molecular weight of 1,100,000 was prepared in the same manner as in Production Example 1, except that a monomer mixture containing 95 parts of butyl acrylate and 5 parts of 4-hydroxybutyl acrylate was used instead in Production Example 1.

Production Example 4

Preparation of Hydroxyl Group-Containing (Meth)acryl-Based Polymer (A-4)

A solution of a hydroxyl group-containing (meth)acryl-based polymer (A-4) with a weight average molecular weight of 1,000,000 was prepared in the same manner as in Production Example 1, except that a monomer mixture containing 93 parts of butyl acrylate and 7 parts of 4-hydroxybutyl acrylate was used instead in Production Example 1.

Production Example 5

Preparation of Hydroxyl Group-Containing (Meth)acryl-Based Polymer (A-5)

A solution of a hydroxyl group-containing (meth)acryl-based polymer (A-5) with a weight average molecular weight of 1,100,000 was prepared in the same manner as in Production Example 1, except that a monomer mixture containing 90 parts of butyl acrylate and 10 parts of 4-hydroxybutyl acrylate was used instead in Production Example 1.

Production Example 6

Preparation of Hydroxyl Group-Containing (Meth)acryl-Based Polymer (A-6)

A reaction vessel equipped with a condenser tube, a nitrogen introducing tube, a thermometer, and a stirrer was charged with 99 parts of butyl acrylate, 1 part of 2-hydroxyethyl acrylate (HEA), and 1 part of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing a hydroxyl group-containing (meth)acryl-based polymer (A-6) with a weight average molecular weight of 1,000,000 (solid concentration: 30% by weight).

Production Example 7

Preparation of Hydroxyl Group-Containing (Meth)acryl-Based Polymer (A-7)

A solution of a hydroxyl group-containing (meth)acryl-based polymer (A-7) with a weight average molecular weight of 1,000,000 was prepared in the same manner as in Production Example 1, except that a monomer mixture containing 97 parts of butyl acrylate and 3 parts of 2-hydroxyethyl acrylate was used instead in Production Example 1.

Production Example 8

Preparation of Hydroxyl Group-Containing (Meth)acryl-Based Polymer (A-8)

A solution of a hydroxyl group-containing (meth)acryl-based polymer (A-8) with a weight average molecular weight of 1,100,000 was prepared in the same manner as in Production Example 1, except that a monomer mixture containing 95 parts of butyl acrylate and 5 parts of 2-hydroxyethyl acrylate was used instead in Production Example 1.

Production Example 9

Preparation of Hydroxyl Group-Containing (Meth)acryl-Based Polymer (A-9)

A solution of a hydroxyl group-containing (meth)acryl-based polymer (A-9) with a weight average molecular weight of 1,100,000 was prepared in the same manner as in Production Example 1, except that a monomer mixture containing 93 parts of butyl acrylate and 7 parts of 2-hydroxyethyl acrylate was used instead in Production Example 1.

Production Example 10

Preparation of Hydroxyl Group-Containing (Meth)acryl-Based Polymer (A-10)

A solution of a hydroxyl group-containing (meth)acryl-based polymer (A-10) with a weight average molecular weight of 1,100,000 was prepared in the same manner as in Production Example 1, except that a monomer mixture containing 90 parts of butyl acrylate and 10 parts of 2-hydroxyethyl acrylate was used instead in Production Example 1.

Example 1

Preparation of Pressure-Sensitive Adhesive Composition

Based on 100 parts of the solid in the hydroxyl group-containing (meth)acryl-based polymer solution obtained in Production Example 1, 0.1 part of trimethylolpropane xylylene diisocyanate (Takenate D110N manufactured by Mitsui Chemicals, Inc.), 0.3 part of dibenzoyl peroxide, 0.1 part of γ-glycidoxypropylmethoxysilane (KBM-403 manufactured by Shin-Etsu Chemical Co., Ltd.), and 1 part of lithium bis(nonafluorobutanesulfonyl)imide (EF-N445 (trade name) manufactured by Mitsubishi Materials Electronic Chemicals Co., Ltd.) were added to the hydroxyl group-containing (meth)acryl-based polymer solution to form an acryl-based pressure-sensitive adhesive solution.

(Preparation of Pressure-Sensitive Adhesive Layer-Attached Optical Film)

The acryl-based pressure-sensitive adhesive solution was uniformly applied to the surface of a silicone release agent-treated polyethylene terephthalate film (backing) with a fountain coater and then dried in an air circulation-type thermostatic oven at 155° C. for 2 minutes, so that a 20 μm-thick pressure-sensitive adhesive layer was formed on the surface of the backing. Subsequently, the pressure-sensitive adhesive layer-attached separator was bonded to the TAC-based polarizing film (1) to form a pressure-sensitive adhesive layer-attached polarizing film.

Examples 2 to 19 and Comparative Examples 1 to 5

Pressure-sensitive adhesive layer-attached polarizing films were prepared in the same manner as in Example 1, except that the amount of each component was changed as shown in Table 1 in the preparation of the pressure-sensitive adhesive composition and that the type of polarizing film was changed as shown in Table 1 in the preparation of the pressure-sensitive adhesive layer-attached polarizing film in Production Example 1.

The pressure-sensitive adhesive layer-attached polarizing films obtained in the examples and the comparative examples were evaluated as described below. Table 1 shows the evaluation results.

<Surface Resistance (Initial Resistance)>

After the separator film was peeled off from the pressure-sensitive adhesive layer-attached polarizing film, the surface resistance (Ω/□) of the pressure-sensitive adhesive surface was measured with MCP-HT450 manufactured by Mitsubishi Chemical Analytech Co., Ltd.

<Evaluation of Static Electricity-Induced Unevenness>

The prepared pressure-sensitive adhesive layer-attached polarizing film was cut into a piece with a size of 100 mm×100 mm, which was then bonded to a liquid crystal panel. The panel was then placed on a backlight with a brightness of 10,000 cd, and the orientation of the liquid crystal was disturbed using 5 kV static electricity generated by an electrostatic generator ESD (ESD-8012A manufactured by Sanki Electronic Industries Co., Ltd.). The time (seconds) required for recovery from the orientation failure-induced display failure was measured with an instantaneous multichannel photodetector system (MCPD-3000 manufactured by Otsuka Electronics Co., Ltd) and evaluated according to the criteria below.

⊙: Display failure disappeared in a time of less than one second.
◯: Display failure disappeared in a time of one second or more to less than 10 seconds.
×: Display failure disappeared in a time of 10 seconds or more.

<Surface Resistance (Resistance After Humidity Test)>

The pressure-sensitive adhesive layer-attached polarizing film obtained in each of the examples and the comparative examples was placed in a thermo-hygrostat at 60° C. and 95% RH. After 48 hours, the pressure-sensitive adhesive layer-attached polarizing film was taken out and then dried at 60° C. for 2 hours. Subsequently, the separator film was peeled off from the pressure-sensitive adhesive layer-attached polarizing film, and the surface resistance of the pressure-sensitive adhesive surface was measured with MCP-HT450 manufactured by Mitsubishi Chemical Analytech Co., Ltd.

<Durability>

The separator film was peeled off from the pressure-sensitive adhesive layer-attached polarizing film obtained in each of the examples and the comparative examples. The polarizing film was then bonded to a non-alkali glass plate. The resulting laminate was autoclaved at 50° C. and 5 atm for 15 minutes and then stored in a heating oven at 80° C. and stored in a thermo-hygrostat at 60° C. and 90% RH. After 500 hours, the presence or absence of peeling polarizing film was observed. The case where no peeling was detected at all was rated as "⊙", the case where peeling occurred at an invisible level was rated as "◯", the case where visible small peeling occurred was rated as "Δ", and the case where significant peeling was observed was rated as "×".

<Adhering Strength>

The adhering strength (N/25 mm, 80 m long in the measurement) was measured by peeling off the sample at a peeling angle of 90° and a peeling rate of 300 mm/minute using a tensile tester (AUTOGRAPH AG-1 10KN manufactured by SHIMADZU CORPORATION). In the measurement, sampling was performed at intervals of 0.5 seconds (per one time), and the measured values were averaged.

TABLE 1

| | Pressure-sensitive adhesive composition | | | | | | | | | | | | | |
|---|---|---|---|---|---|---|---|---|---|---|---|---|---|---|
| | Hydroxyl group-containing (meth)acryl-based polymer (A) | | | | Ionic compound (B) | | Polyether compound (E) | | Crosslinking agent (C) | | | | Silane coupling agent (D) | |
| | | | | | | | | | Isocyanate | | Peroxide | | | |
| | Type | HBA | HEA | Parts | Type | Parts | Type | Parts | Type | Parts | Type | Parts | Type | Parts |
| Example 1 | A-1 | 1 | | 100 | B-1 | 1 | | | C-1 | 0.1 | C-2 | 0.3 | D-1 | 0.1 |
| Example 2 | A-2 | 3 | | 100 | B-1 | 1 | | | C-1 | 0.1 | C-2 | 0.3 | D-1 | 0.1 |
| Example 3 | A-3 | 5 | | 100 | B-1 | 1 | | | C-1 | 0.1 | C-2 | 0.3 | D-1 | 0.1 |
| Example 4 | A-4 | 7 | | 100 | B-1 | 1 | | | C-1 | 0.1 | C-2 | 0.3 | D-1 | 0.1 |
| Example 5 | A-5 | 10 | | 100 | B-1 | 1 | | | C-1 | 0.1 | C-2 | 0.3 | D-1 | 0.1 |
| Example 6 | A-6 | | 1 | 100 | B-1 | 1 | | | C-1 | 0.1 | C-2 | 0.3 | D-1 | 0.1 |
| Example 7 | A-7 | | 3 | 100 | B-1 | 1 | | | C-1 | 0.1 | C-2 | 0.3 | D-1 | 0.1 |
| Example 8 | A-8 | | 5 | 100 | B-1 | 1 | | | C-1 | 0.1 | C-2 | 0.3 | D-1 | 0.1 |
| Example 9 | A-9 | | 7 | 100 | B-1 | 1 | | | C-1 | 0.1 | C-2 | 0.3 | D-1 | 0.1 |
| Example 10 | A-10 | | 10 | 100 | B-1 | 1 | | | C-1 | 0.1 | C-2 | 0.3 | D-1 | 0.1 |
| Example 11 | A-2 | 5 | | 100 | B-1 | 0.1 | | | C-1 | 0.1 | C-2 | 0.3 | D-1 | 0.1 |
| Example 12 | A-2 | 5 | | 100 | B-1 | 2 | | | C-1 | 0.1 | C-2 | 0.3 | D-1 | 0.1 |
| Example 13 | A-2 | 5 | | 100 | B-1 | 4 | | | C-1 | 0.1 | C-2 | 0.3 | D-1 | 0.1 |
| Example 14 | A-2 | 5 | | 100 | B-2 | 1 | | | C-1 | 0.1 | C-2 | 0.3 | D-1 | 0.1 |
| Example 15 | A-2 | 5 | | 100 | B-3 | 1 | | | C-1 | 0.1 | C-2 | 0.3 | D-1 | 0.1 |
| Example 16 | A-2 | 5 | | 100 | B-4 | 1 | | | C-1 | 0.1 | C-2 | 0.3 | D-1 | 0.1 |
| Example 17 | A-2 | 5 | | 100 | B-5 | 1 | | | C-1 | 0.1 | C-2 | 0.3 | D-1 | 0.1 |
| Example 18 | A-2 | 5 | | 100 | B-1 | 1 | SAT10 | 0.5 | C-1 | 0.1 | C-2 | 0.3 | D-1 | 0.1 |
| Example 19 | A-2 | 5 | | 100 | B-1 | 1 | SIB | 0.5 | C-1 | 0.1 | C-2 | 0.3 | D-1 | 0.1 |

TABLE 1-continued

| | | | | | | | | | | | | |
|---|---|---|---|---|---|---|---|---|---|---|---|---|
| Comparative Example 1 | | 0 | 100 | B-1 | 1 | | C-1 | 0.1 | C-2 | 0.3 | D-1 | 0.1 |
| Comparative Example 2 | A-2 | 5 | 100 | B-1 | 0 | | C-1 | 0.1 | C-2 | 0.3 | D-1 | 0.1 |
| Comparative Example 3 | A-8 | 5 | 100 | B-1 | 0 | | C-1 | 0.1 | C-2 | 0.3 | D-1 | 0.1 |
| Comparative Example 4 | A-2 | 5 | 100 | B-6 | 1 | | C-1 | 0.1 | C-2 | 0.3 | D-1 | 0.1 |
| Comparative Example 5 | A-2 | 5 | 100 | B-7 | 1 | | C-1 | 0.1 | C-2 | 0.3 | D-1 | 0.1 |

| | | Evaluations | | | | | | |
|---|---|---|---|---|---|---|---|---|
| | | Initial surface resistance | | Surface resistance after humidification | | Durability | | Adhering strength |
| | Polarizing film type | $\Omega/\square$ | Static electricity-induced unevenness | $\Omega/\square$ | Static electricity-induced unevenness | Heating 85° C. | Humidification 60° C./ 95% RH | Initial N/25 mm |
| Example 1 | TAC-based polarizing film (1) | 2.30E+11 | * | 3.80E+11 | * | ○ | ○ | 2.1 |
| Example 2 | TAC-based polarizing film (1) | 2.58E+11 | * | 3.90E+11 | * | * | * | 3.4 |
| Example 3 | TAC-based polarizing film (1) | 2.58E+11 | * | 4.00E+11 | * | * | * | 4.2 |
| Example 4 | TAC-based polarizing film (1) | 2.79E+11 | * | 3.90E+11 | * | * | * | 6.8 |
| Example 5 | TAC-based polarizing film (1) | 2.78E+11 | * | 4.08E+11 | * | * | * | 8.4 |
| Example 6 | TAC-based polarizing film (1) | 2.82E+11 | * | 4.00E+11 | * | ○ | ○ | 2.2 |
| Example 7 | TAC-based polarizing film (1) | 2.88E+11 | * | 4.08E+11 | * | * | * | 3.8 |
| Example 8 | TAC-based polarizing film (1) | 2.86E+11 | * | 4.20E+11 | * | * | * | 4.2 |
| Example 9 | TAC-based polarizing film (1) | 2.71E+11 | * | 4.18E+11 | * | * | * | 7 |
| Example 10 | TAC-based polarizing film (1) | 2.72E+11 | * | 3.90E+11 | * | * | * | 8 |
| Example 11 | TAC-based polarizing film (1) | 3.30E+12 | ○ | 5.80E+12 | ○ | * | * | 4.2 |
| Example 12 | TAC-based polarizing film (1) | 2.28E+11 | * | 3.68E+11 | * | * | * | 4.4 |
| Example 13 | TAC-based polarizing film (1) | 1.10E+11 | * | 2.52E+11 | * | * | * | 4.7 |
| Example 14 | TAC-based polarizing film (1) | 2.71E+11 | * | 3.98E+11 | * | * | * | 4.3 |
| Example 15 | TAC-based polarizing film (1) | 2.78E+11 | * | 3.90E+11 | * | * | * | 4.3 |
| Example 16 | TAC-based polarizing film (1) | 2.78E+11 | * | 4.18E+11 | * | * | * | 4.5 |
| Example 17 | TAC-based polarizing film (1) | 2.83E+11 | * | 3.80E+11 | * | * | * | 4.2 |
| Example 18 | TAC-based polarizing film (1) | 2.80E+11 | * | 4.06E+11 | * | * | * | 2.3 |
| Example 19 | TAC-based polarizing film (1) | 2.72E+11 | * | 4.02E+11 | * | * | * | 2 |
| Comparative Example 1 | TAC-based polarizing film (1) | 2.74E+11 | * | 4.22E+11 | * | x | x | 2 |
| Comparative Example 2 | TAC-based polarizing film (1) | $10^{13}$ or more | x | $10^{13}$ or more | x | * | * | 4.3 |
| Comparative Example 3 | TAC-based polarizing film (1) | $10^{13}$ or more | x | $10^{13}$ or more | x | * | * | 4.2 |
| Comparative Example 4 | TAC-based polarizing film (1) | 2.89E+11 | * | 9.00E+12 | x | ○ | x | 4.4 |
| Comparative Example 5 | TAC-based polarizing film (1) | 4.06E+11 | * | $10^{13}$ or more | x | ○ | x | 4.4 |

Concerning the ionic compound (B) shown in Table 1, "B-1" represents lithium bis(nonafluorobutanesulfonyl)imide (EF-N445 (trade name) manufactured by Mitsubishi Materials Electronic Chemicals Co., Ltd.), "B-2" lithium bis(heptafluoropropanesulfonyl)imide (manufactured by Wako Pure Chemical Industries, Ltd.), Mitsubishi Materials Electronic Chemicals Co., Ltd.), "B-3" lithium cyclohexafluoropropane-1,3-bis(sulfonyl)imide (EF-N305 (trade name) manufactured by Mitsubishi Materials Electronic Chemicals Co., Ltd.), "B-4" 1-butyl-3-methylpyridinium bis(nonafluorobutanesulfonyl)imide (BuMePy.N441 (trade name) manufactured by Mitsubishi Materials Electronic Chemicals Co., Ltd.), "B-5" dilithium 1,1,2,2,3,3-hexafluoropropane-1,3-disulfonate (EF-3005 (trade name) manufactured by Mitsubishi Materials Electronic Chemicals Co., Ltd.), "B-6" lithium bis(trifluoromethanesulfonyl)imide (manufactured by Wako Pure Chemical Industries, Ltd.), and "B-7" 1-butyl-3-methylpyridinium bis(trifluoromethanesulfonyl)imide (CIL-312 (trade name) manufactured by Japan Carlit Co., Ltd.).

Concerning the crosslinking agent (C), "C-1" represents an isocyanate crosslinking agent manufactured by Mitsui Chemicals, Inc. (Takenate D110N (trade name), trimethylolpropane xylylene diisocyanate), and "C-2" dibenzoyl peroxide (NYPER BMT) manufactured by NOF CORPORATION.

Concerning the silane coupling agent (D), "D-1" represents KBM-403 manufactured by Shin-Etsu Chemical Co., Ltd.

Concerning the polyether compound (E), "E-1" represents SILYL SAT10 (trade name) manufactured by Kaneka Corporation, and "E-2" SIB1824.82 (trade name) manufactured by Gelest, Inc.

The invention claimed is:

1. A pressure-sensitive adhesive composition, comprising:
   a (meth)acryl-based polymer (A); and
   an ionic compound (B) comprising an anion component and a cation component, wherein
   the (meth)acryl-based polymer (A) is a hydroxyl group-containing (meth)acryl-based polymer (A) containing a monomer unit derived from a hydroxyl group-containing monomer, and the anion component is at least one of anion components represented by the following formula (1):

$$(C_nF_{2n+1}SO_2)_2N^- \qquad (1)$$

wherein n is an integer of 3 to 10; the following formula (2):

$$CF_2(C_mF_{2m}SO_2)_2N^- \qquad (2)$$

wherein m is an integer of 2 to 10; and the following formula (3):

$$^-O_3S(CF_2)_lSO_3^- \qquad (3)$$

wherein l is an integer of 3 to 10,
wherein the cation component is a lithium cation component or a pyridinium cation component.

2. The pressure-sensitive adhesive composition according to claim 1, wherein the cation component of the ionic compound (B) is a lithium cation.

3. The pressure-sensitive adhesive composition according to claim 1, wherein the anion component of the ionic compound (B) is at least one of a bis(heptafluoropropanesulfonyl)imide anion, a bis(nonafluorobutanesulfonyl)imide anion, a cyclo-hexafluoropropane-1,3-bis(sulfonyl)imide anion, and a hexafluoropropane-1,3-disulfonate anion.

4. The pressure-sensitive adhesive composition according to claim 1, which comprises 0.001 to 10 parts by weight of the ionic compound (B) based on 100 parts by weight of the hydroxyl group-containing (meth)acryl-based polymer (A).

5. The pressure-sensitive adhesive composition according to claim 1, wherein the hydroxyl group-containing (meth) acryl-based polymer (A) contains a monomer unit derived from a carboxyl group-containing monomer.

6. The pressure-sensitive adhesive composition according to claim 1, further comprising a crosslinking agent (C).

7. The pressure-sensitive adhesive composition according to claim 6, which comprises 0.01 to 20 parts by weight of the crosslinking agent (C) based on 100 parts by weight of the hydroxyl group-containing (meth)acryl-based polymer (A).

8. The pressure-sensitive adhesive composition according to claim 6, wherein the crosslinking agent (C) is at least one of an isocyanate compound and a peroxide.

9. The pressure-sensitive adhesive composition according to claim 1, further comprising 0.001 to 5 parts by weight of a silane coupling agent (D) based on 100 parts by weight of the hydroxyl group-containing (meth)acryl-based polymer (A).

10. The pressure-sensitive adhesive composition according to claim 1, further comprising 0.001 to 10 parts by weight of a polyether-modified silicone (E) based on 100 parts by weight of the hydroxyl group-containing (meth) acryl-based polymer (A).

11. The pressure-sensitive adhesive composition according to claim 1, wherein the hydroxyl group-containing (meth)acryl-based polymer (A) has a weight average molecular weight of 500,000 to 3,000,000.

12. A pressure-sensitive adhesive layer comprising a product made from the pressure-sensitive adhesive composition according to claim 1.

13. A pressure-sensitive adhesive layer-attached polarizing film comprising at least a polarizing film and the pressure-sensitive adhesive layer according to claim 12.

14. The pressure-sensitive adhesive layer-attached polarizing film according to claim 13, further comprising an adhesion-facilitating layer between the polarizing film and the pressure-sensitive adhesive layer.

15. An image display device comprising at least one piece of the pressure-sensitive adhesive layer-attached polarizing film according to claim 13.

* * * * *